(12) United States Patent
Pant et al.

(10) Patent No.: US 7,268,505 B2
(45) Date of Patent: Sep. 11, 2007

(54) ELECTRIC MACHINE AND METHOD OF OPERATING THE ELECTRIC MACHINE

(75) Inventors: Albert Keith Pant, Carlisle, OH (US); Brian Thomas Branecky, Oconomowoc, WI (US); William L. Mehlhorn, Menomonee Falls, WI (US); Andrew W. Phillips, Columbia, SC (US)

(73) Assignee: A. O. Smith Corporation, Milwaukee, WI (US)

( * ) Notice: Subject to any disclaimer, the term of this patent is extended or adjusted under 35 U.S.C. 154(b) by 31 days.

(21) Appl. No.: 11/039,664

(22) Filed: Jan. 19, 2005

(65) Prior Publication Data

US 2005/0162108 A1    Jul. 28, 2005

Related U.S. Application Data

(63) Continuation-in-part of application No. 10/662,052, filed on Sep. 12, 2003, now Pat. No. 7,102,324.

(60) Provisional application No. 60/538,717, filed on Jan. 23, 2004.

(51) Int. Cl.
*H02K 21/00* (2006.01)
(52) U.S. Cl. ............... 318/254; 318/798; 318/439; 318/800
(58) Field of Classification Search ............... None
See application file for complete search history.

(56) References Cited

U.S. PATENT DOCUMENTS

| | | | |
|---|---|---|---|
| 3,736,480 A | 5/1973 | Lee | |
| 4,242,626 A | 12/1980 | Gross | |
| 4,349,148 A * | 9/1982 | Liberto et al. | ................. 236/11 |
| 4,409,533 A | 10/1983 | Kawabata | |
| 4,566,289 A | 1/1986 | Iizuka et al. | |
| 4,788,485 A | 11/1988 | Kawagishi et al. | |
| 4,893,479 A * | 1/1990 | Gillett et al. | ................. 62/213 |
| 5,168,202 A | 12/1992 | Bradshaw et al. | |
| 5,212,438 A | 5/1993 | Miyazaki et al. | |
| 5,350,992 A | 9/1994 | Colter | |
| 5,387,855 A | 2/1995 | Miyazaki et al. | |
| 5,444,350 A | 8/1995 | Werle et al. | |
| 5,514,943 A | 5/1996 | Shapess | |
| 5,612,605 A | 3/1997 | Tao | |
| 5,689,169 A | 11/1997 | Kerkman et al. | |
| 5,760,567 A * | 6/1998 | Nakamura et al. | ........... 318/777 |
| 5,818,194 A | 10/1998 | Nordby | |
| 5,883,490 A | 3/1999 | Moreira | |
| 5,923,728 A | 7/1999 | Ikkai et al. | |
| 5,965,995 A | 10/1999 | Seibel et al. | |
| 5,994,869 A | 11/1999 | Becerra | |

(Continued)

Primary Examiner—Lincoln Donovan
Assistant Examiner—Renata McCloud
(74) Attorney, Agent, or Firm—Michael Best & Friedrich LLP

(57) ABSTRACT

A method of and apparatus for controlling an electric machine. The method can include using a controller to detect whether power is present at a first node of the controller, detect whether power is present at a second node of the controller, generate at least one signal based at least in part on the detection, and energize the electric machine using a detected power when the at least one signal indicates power is present at at least one of the first node, the second node, and a combination of the first node and the second node.

40 Claims, 5 Drawing Sheets

U.S. PATENT DOCUMENTS

| | | |
|---|---|---|
| 6,037,725 A | 3/2000 | Tolbert, Jr. |
| 6,075,328 A | 6/2000 | Notohara et al. |
| 6,081,091 A | 6/2000 | Mitchell et al. |
| 6,107,776 A | 8/2000 | Nakazawa |
| 6,118,239 A | 9/2000 | Kadah |
| 6,121,747 A | 9/2000 | Trachtenberg |
| 6,157,156 A | 12/2000 | Tsuruta |
| 6,172,476 B1 | 1/2001 | Tolbert, Jr. et al. |
| 6,198,240 B1 | 3/2001 | Notohara et al. |
| 6,246,207 B1 | 6/2001 | VanSistine et al. |
| 6,264,431 B1 * | 7/2001 | Triezenberg ................ 417/36 |
| 6,313,593 B1 | 11/2001 | Matsubara et al. |
| 6,316,895 B1 | 11/2001 | Ramarathnam |
| 6,329,783 B1 * | 12/2001 | Vrionis et al. .............. 318/772 |
| 6,329,785 B1 | 12/2001 | Starkie et al. |
| 6,356,043 B2 | 3/2002 | Baum |
| 6,369,544 B1 | 4/2002 | Kadah |
| 6,489,742 B2 | 12/2002 | Lumsden |
| 6,504,330 B2 | 1/2003 | Fletcher |
| 6,570,778 B2 | 5/2003 | Lipo et al. |
| 6,603,280 B2 | 8/2003 | Notohara et al. |
| 6,844,697 B2 | 1/2005 | Masaki et al. |
| 6,996,333 B1 * | 2/2006 | Lin ........................... 388/800 |
| 2002/0079859 A1 | 6/2002 | Lumsden |

* cited by examiner

ELECTRIC MACHINE AND METHOD OF OPERATING THE ELECTRIC MACHINE

RELATED APPLICATIONS

This patent application is a continuation-in-part of U.S. patent application Ser. No. 10/662,052, filed on Sep. 12, 2003, now U.S. Pat. No. 7,102,324; and claims the benefit of U.S. Patent Application No. 60/538,717, filed on Jan. 23, 2004, both of which are incorporated herein by reference.

BACKGROUND OF THE INVENTION

The invention generally relates to electric machines (e.g., an induction motor), and more particularly to methods of and apparatus for controlling electric machines.

Many methods and apparatuses are used to control an induction motor. Exemplary methods and apparatuses include speed tap changing, triac controls, and fixed speed drive. In changing the speed taps, an effective reduction in voltage or flux is provided to cause the motor to run at a reduced speed by the nature of a slip. The slip is a measurement of how much the movement of the rotor follows the excitation field, and is defined as the difference between the frequency of the excitation energy and the speed of the motor. While these controls provide adequate speed control, they do so at the expense of efficiency as the motor runs at a higher slip which is proportional to rotor conduction loss.

Electric machines (e.g., induction motors) are often utilized in heating, ventilation, and air conditioning (HVAC) systems to drive blowers that move fluid (e.g., air) through the system. Electric machines are also used in other applications (e.g., to drive fluid pumps) that require adjustment of a control parameter of the electric machine (e.g., speed, torque, fluid flow, and the like) to meet the system requirements.

SUMMARY OF THE INVENTION

Although numerous methods and apparatus are known to adjust a control parameter of an electric machine (e.g., speed tap changing, triac control, fixed speed drives, and the like), new methods and apparatus that provide efficient operation of electric machines and that simplify installation would be welcomed by those of skill in the art.

An electric machine assembly (e.g., an electric machine and a controller connected to the electric machine), or a portion thereof, incorporating aspects of the invention can be used in new systems (e.g., HVAC systems) and/or retrofit in existing systems.

In a fixed speed drive, a series of signals are entered from the thermostat. These signals are then interpreted by a thermostat logic and timing control that is enabled by an inverter circuitry and a micro-controller. While the fixed speed drive is an inexpensive and efficient product that provides half speed settings, a number of components will have to be replaced when an original equipment manufacturer ("OEM") chooses to use the fixed speed drive. For example, the OEM may have to replace the induction motor with optional taps and relays that are used to select voltage and speed. Replacing these components can be costly.

Accordingly, there is need for an interface between a thermostat and an induction motor that also provides high motor efficiency at low-speed. In a first embodiment of the invention, a fixed speed drive ("FSD") interface that includes a controller is configured to determine at which speed to operate a motor based on an AC input. The FSD interface receives electrical power from a tapped winding relay that has two AC input connections: a high-speed connection and a low-speed connection. The high-speed connection directly drives the motor. The low-speed connection powers the motor through an inverter or a capacitor and inverter sub-circuit. The FSD interface also includes an analog-to-digital converter ("ADC") that detects the difference in voltage between the high-speed and low-speed voltages. Based on this voltage difference from the ADC, a controller determines whether to power the motor from the high-speed connection or from the low-speed connection via the inverter.

The invention also provides a controller for an electric machine. The controller includes a first voltage input, a second voltage input, and an inverter. The first voltage input is configured to receive a first voltage, and is operable to directly provide the first voltage to the electric machine. The second voltage input similarly configured to receive a second voltage. The inverter is coupled to the second voltage input, and is activated by the second voltage. The inverter is also configured to frequency-regulate the second voltage to generate a frequency-regulated voltage, and to provide the frequency-regulated voltage to the electric machine.

The invention also provides a method of controlling an electric machine. The method includes the step of providing one source of unregulated electrical power selectively connected to the electric machine through a relay when a first speed is selected. The method includes the step of generating a second source of regulated electrical power when a second speed is selected, the second source is selectively connected to the electric machine through the relay. The method includes the step of selectively switching the relay to connect the electric machine to the one source corresponding to the first speed, and to the second source for operation of the electric machine corresponding to the second speed.

The invention also provides a method of controlling an electric machine using a controller where the electric machine comprises a rotor and a stator. The method can comprise detecting whether power is present at a first node of the controller, detecting whether power is present at a second node of the controller, and generating at least one signal based at least in part on the detection. The method can also comprise using a detected power to energize the electric machine when the at least one signal indicates power is present at at least one of the first node, the second node, and a combination of the first node and the second node.

The invention provides a method of controlling an electric machine using a controller where the electric machine comprises a rotor and a stator and the controller comprises a programmable device. The method can comprise detecting whether power is present at a first node of the controller, detecting whether power is present at a second node of the controller, generating at least one signal based at least in part on the detection, and selecting a control mode of the programmable device from a plurality of control modes based at least in part on the at least one signal. The method can also comprise the programmable device generating a control signal based at least in part on the control mode and using the control signal to control energization of the electric machine where the electric machine is energized using a detected power.

The invention also provides a system comprising an electric machine and a controller. The electric machine can comprise a stator and a rotor and be electrically connected to the controller. The controller can comprise a first node configured to receive a first power, a second node configured to receive a second power, and a first circuit configured to detect whether the first power is present at a first node of the controller, detect whether the second power is present at the second node, generate at least one signal, and isolate the at least one signal from the first power and the second power. The at least one signal can be representative of whether the first power is present at the first node and whether the second power is present at the second node. The controller can also comprise a second circuit configured to receive the at least one signal and generate a switch control signal, and a switch configured to selectively energize the electric machine based at least in part on the switch control signal. The switch can use at least one of the first power, the second power, and a combination of the first power and the second power to energize the electric machine when the at least one signal indicates at least one of the first power is present at the first node, the second power is present at the second node, and a combination of the first power is present and the first node and the second power is present at the second node.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
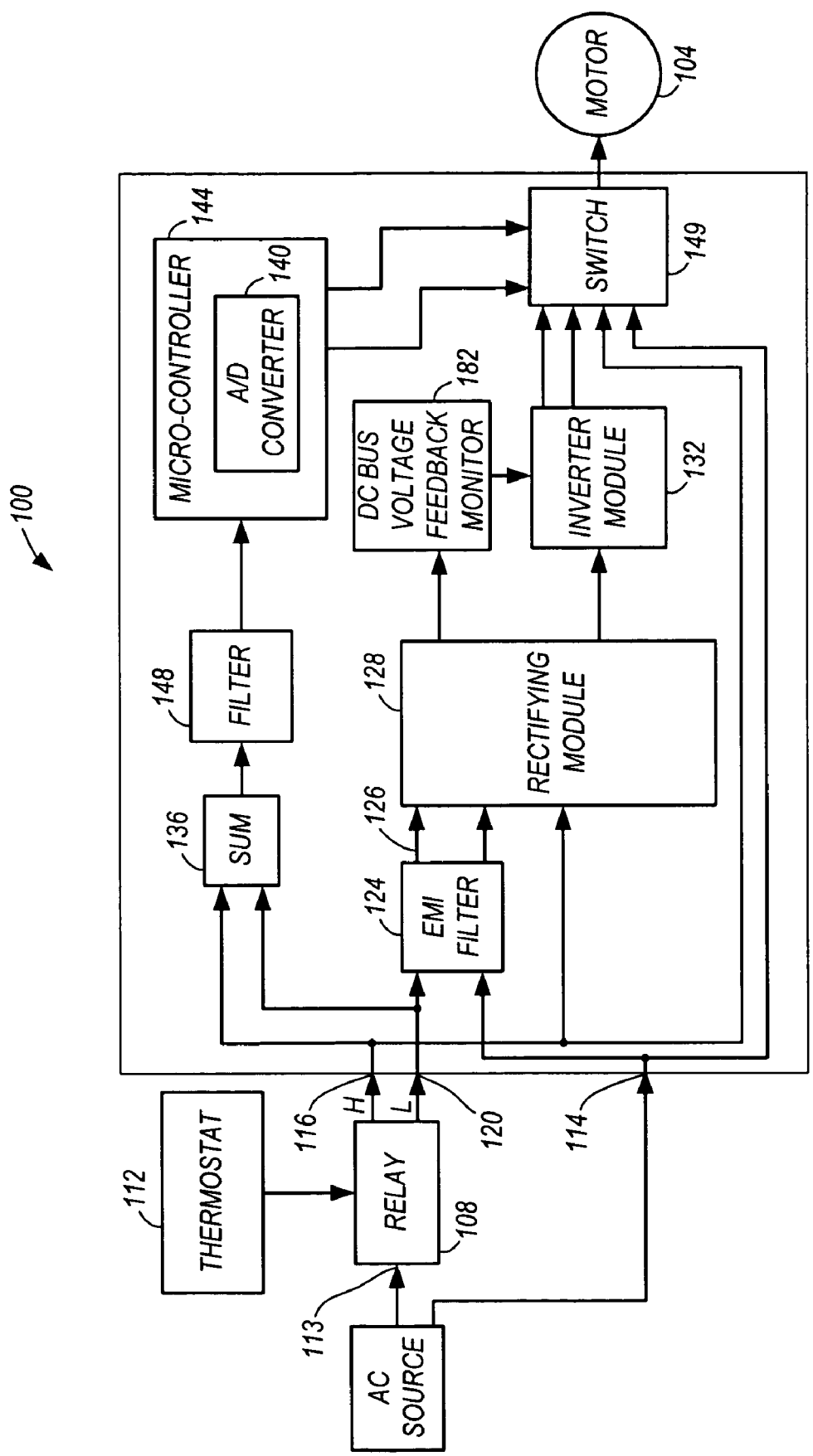
FIG. 1 shows a block diagram of a fixed speed drive interface.

FIG. 1 shows a block diagram of a FSD interface 100 coupled to an induction motor 104. The interface 100 includes a thermostat relay or tapped winding relay 108 that receives a selection input from a thermostat 112, and power from an alternating current ("AC") power source line-in 113. The interface 100 also receives a second AC power source line-in at input 114. The tapped winding relay 108 has two speed outputs 116, 120 representing a high-speed signal and a low-speed signal, respectively. More specifically, the tapped winding relay 108 will generate a high-speed signal when the motor 104 is run at a full-speed mode, whereas the tapped winding relay 108 will generate a low-speed signal when the motor 104 is run at a low-speed mode. The low-speed signal output 120 is fed into an electromagnetic interference ("EMI") filter 124 to attenuate electromagnetic interference to generate a filtered low-speed output 126. The filtered low-speed output 126 and the high-speed signal output 116 are coupled to a rectifying circuit 128 to generate different levels of direct current ("DC"). The relay 108 includes a plurality of inputs that are opto-isolated from the high voltage side of the interface 100. The inputs can be configured for inputs, such as from a thermostat, to turn the interface 100 on for high speed operation at an operating frequency, for example, between 50 Hz and 60 Hz, or to turn the interface on for a preset low speed operation. Furthermore, these inputs can also be configured for pulse width modulation control for running the motor 104 at low speed.

The high-speed output 116 and the low-speed output 120 are also summed individually in a summing module 136 to provide different analog voltages each representing a particular speed. For example, the high-speed output 116 can be summed into a 10KΩ resistor via a 1MΩ resistor. Meanwhile, the filtered low-speed output 126 can be summed into the 10KΩ resistor via a 499KΩ resistor to generate a summed voltage. The summing module 136 thus provides a summed voltage that represents either a high-speed signal or a low-speed signal. The summed voltage is further conditioned at a filter module 148 to filter out undesirable noise or to clean the summed voltage so that the summed voltage is detectable by an A/D converter ("ADC") 140. The ADC 140 can be embedded in a micro-controller 144 as shown in FIG. 1, or the ADC 140 is external to the micro-controller 144. Examples of micro-controller include embedded micro-controller, such as PIC 16C717I/SS from MicroChip, and ST micro-controller from ST Microelectronics. The micro-controller 144 reads in the summed voltage, and then generates a software control or selection signal based on the summed voltage. The micro-controller 144 further includes an internal memory (not shown) that stores a plurality of codes and associated parameters. Although the memory is described as internal to the micro-controller 144, external memory can also be used in the interface to store data such as customer-specific parameters.

In the construction shown in FIG. 1, the rectifying circuit 128 includes a high-speed rectifier and a low-speed rectifier. Each of the rectifiers includes a full wave bridge rectifier that has four diodes. Additionally, the high-speed rectifier and the low-speed rectifier share a common pair of diodes, and a common rectified or DC output. The DC output is frequency regulated in a capacitor-inverter circuit or an inverter module 132. Particularly, the inverter module 132 includes a first capacitor that is serially connected to a second capacitor. The inverter module 132 also includes a plurality of power switches that are arranged in parallel with the first and the second capacitors. The inverter module 132 is configured to provide one or perhaps only a few fixed, predetermined speeds that are less than the rated full operating speed at full line voltage at input 116. At low speed, in order to reduce the torque output to match a fan law torque curve, the micro-controller 144 is configured to determine a quadratic voltage-to-frequency control relationship between an applied voltage and the operating frequency. As a result of the quadratic relationship, the motor 104 requires approximately only half the voltage normally supplied during full speed operation.

Although voltage-to-frequency control relationship described in the construction of FIG. 1 is quadratic, other forms of motor applied voltage/operating frequency relationship can also be used such that the voltage and the frequency can be controllably applied. In the construction shown, the output frequency of the inverter module 132 ranges from about 32 Hz to about 45 Hz based on inverter power limit. A potentiometer can also be used to allow a user to adjust the output frequency in the same range.

Although the high-speed signal output 116 generally indicates the motor 104 is to be run at full speed (for example, between 50 Hz and 60 Hz), it will be appreciated that multiple full speed scenarios can be installed in systems where a multiple-tapped motor is used. Specifically, in a construction where a single speed single phase ("SSSP") permanent split capacitor ("PSC") motor is used the high-speed signal output 116 will have a single high-speed value at a fixed operating frequency, such as 60 Hz. In yet another construction, the interface 100 can be coupled to a multiple-tapped, single phase ("MTSP") PSC motor. In such case, the high-speed signal output 116 will have multiple speed values all running at a single operating frequency, such as 60 Hz. Furthermore, the interface 100 will have multiple outputs coupled to the MTSP PSC motor.

Referring back to FIG. 1, the interface 100 also includes a switching module 149. The switching module 149 selects either the low speed signal or voltage from the inverter module 132 based on a pair of software generated control or selection signals from the micro-controller 144. For example, when it is desired to run the motor 104 at high speed, the high speed output 116 of the tapped winding relay 108 will relay direct AC power from input 113, while the low speed output 120 is essentially open, deactivated or having a null value. The high-speed signal is also summed into the 10KΩ resistor via the 1MΩ resistor at the summing module 136, filtered at the filtering module 148, and fed to the ADC 140. Thereafter, the micro-controller 144 processes the summed voltage and switches the switching module 149 to relay the high-speed voltage to the motor 104. When it is desired to run the motor 104 at low speed, the low speed output 120 is EMI filtered, rectified at the rectifying circuit 128, and frequency regulated at the inverter module 132. Efficient and frequency regulated low speed voltage is thereafter provided to the switching module 149. The frequency regulated low speed voltage can then be selected by the micro-controller 144.

Figure 2:
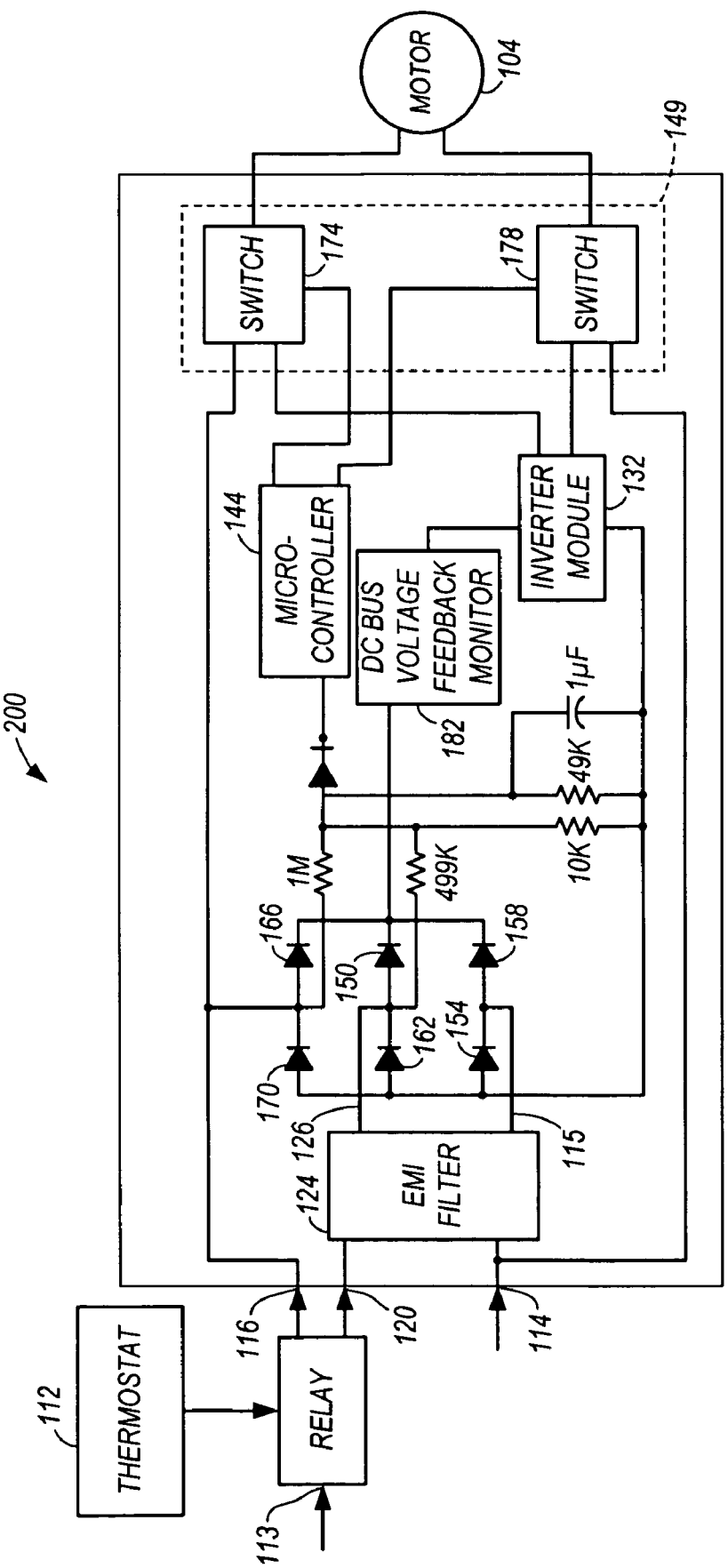
FIG. 2 shows a circuit diagram of the interface shown in FIG. 1.

A detailed circuit diagram 200 of the interface 100 is shown in FIG. 2. The low-speed output 120 is filtered at the EMI filter 124 to yield a filtered low-speed output 126. The filtered low-speed output 126 and an EMI filtered AC power line-in 115 are coupled to a low-speed rectifier of the rectifying circuit 128 to generate a low-speed DC signal. The low-speed rectifier includes a first pair of forward-biased diodes 150, 154, and a second pair of reversed-based diodes 158, 162. Meanwhile, the high-speed signal output 116 together with the EMI filtered AC power line-in 115 are coupled to a high-speed rectifier to generate a high-speed DC signal. Specifically, the high-speed rectifier includes a pair of forward-biased diodes 154, 166, and a pair of reversed-biased diodes 158 and 170. In other words, both the low-speed rectifier and the high-speed rectifier share the diodes 154 and 158. A DC bus feedback monitor 182 couples the rectifying circuit 128 to the inverter module 132. The DC bus feedback monitor 182 is configured to monitor the rectified voltage (sometimes referred to as a DC bus voltage or a DC speed signal) of the rectifying circuit 128. When the monitored DC speed signal changes, the DC bus feedback monitor 182 will alert the micro-controller 144 to adjust the output duty cycle of the inverter module 132 accordingly. The DC bus feedback monitor 182 is also configured to detect different types of full speed AC voltages, such as 115 VAC and 230 VAC. The DC speed signal is then fed to the inverter module 132 to provide one or perhaps only a few fixed, predetermined speeds that are less than the rated full operating speed at full line voltage at input 116.

Furthermore, either the high-speed signal output 116 is summed into a 10KΩ resistor via a 1MΩ resistor, or the filtered low-speed output 126 is summed into the 10KΩ resistor via a 499KΩ resistor, to generate a summed voltage that represents an analog high-speed signal or low-speed signal. The summed analog voltage is then filtered via a resistor-capacitor type filter before being fed into the ADC 140 of the micro-controller 144. In the construction shown, a 49KΩ resistor is arranged in parallel to a 1 µF capacitor. It should be noted that other filter combinations, and other resistors and capacitor values can also be used to clean up the undesirable noise in the analog summed voltage.

The switching module 149 (FIG. 1) includes two switches 174 and 178 to select between a high-speed input voltage and a low-speed input voltage, as described earlier. Specifically, the micro-controller 144 sends a pair of software control signals or soft control signals as selection signals to the switches 174 and 178 based on the summed voltage. Meanwhile, the inverter module 132 and the high-speed voltages from inputs 114 and 116 provide a low-speed voltage input and a high-speed voltage input to the switches 174 and 178, respectively. When the selection signals from the micro-controller 144 represent high-speed signals, the switches 174 and 178 will couple the high-speed voltages from inputs 114 and 116 to the motor 104. At this time, the inverter module 132 is disabled, while a small amount of power is supplied to the micro-controller 144. When the selection signals from the micro-controller 144 represent low-speed signals, the switches 174 and 178 will couple the low-speed voltages from the inverter module 132 to the motor 104.

Generally, power demanded by a load is typically a non-linear function of the operating speed or frequency. Specifically, when P is the power demanded by a load, C is a constant and S is the motor speed, $P=CS^3$. That is, reducing the motor speed or the operating frequency of the motor by half will reduce the power demanded by the load to ⅛ of the original power when run at fill speed. That is, the interface 100 can efficiently deliver power to the motor 104 using the inverter module 132 after a low-speed voltage has been detected. More specifically, when the low-speed voltage has been detected, the inverter module 132 will be activated. The inverter module 132, which includes a DC capacitor and a plurality of inverters, then regulates the low-speed voltage such that the low-speed voltage has a regulated or a pre-determined operating frequency. For example, when the input 116 is run at 60 Hz, the inverted output voltage from the inverter module 132 can be configured to generate an operating frequency of 30 Hz, that is, half of the original frequency. Since the power is torque times speed, if the motor is run at half speed and the power applied is ⅛ of its original value, the torque is thus ¼ of its original value.

Furthermore, the interface 100 is also configured to detect feedback from the motor 104 when the high-speed or low-speed voltage outputs 116, 120 is disconnected via the tapped winding relay 108. This condition can cause both a high-speed and a low-speed voltage to be fed to the interface 100. More specifically, when the tapped winding relay 108 switches from high speed to low speed, there is normally a time delay for the motor 104 to switch from high speed to low speed. Ideally, there should be no voltage at the high-speed output 116 when switching from high speed to low speed. In practice, however, the motor 104 is still spinning at high speed while the tapped winding relay 108 is switching from high-speed voltage to low-speed voltage. At this time, the summing module 136 generates an unusually high summed voltage representing a sum of the high-speed voltage and the low-speed voltage. When both the low-speed voltage and the high-speed voltage, or a unusually high summed voltage, are detected by the ADC 140, the micro-controller is configured to disconnect the switching module 149 from the motor 104, or to disable the inverter module 132 such that no frequency-regulated voltage is generated. Thereafter, the micro-controller 144 is configured to read the voltage output from the tapped winding relay 108, and to determine an appropriate soft control signal to generate to control the switching module 149 as described earlier. In an alternative construction, the micro-controller 144 can also be configured to detect the presence of the condition where both voltages are fed to the FSD. Upon detecting this condition, the micro-controller 144 can operate the motor 104 at a third speed, a low-speed, a high-speed, or a zero speed setting.

Figure 3:
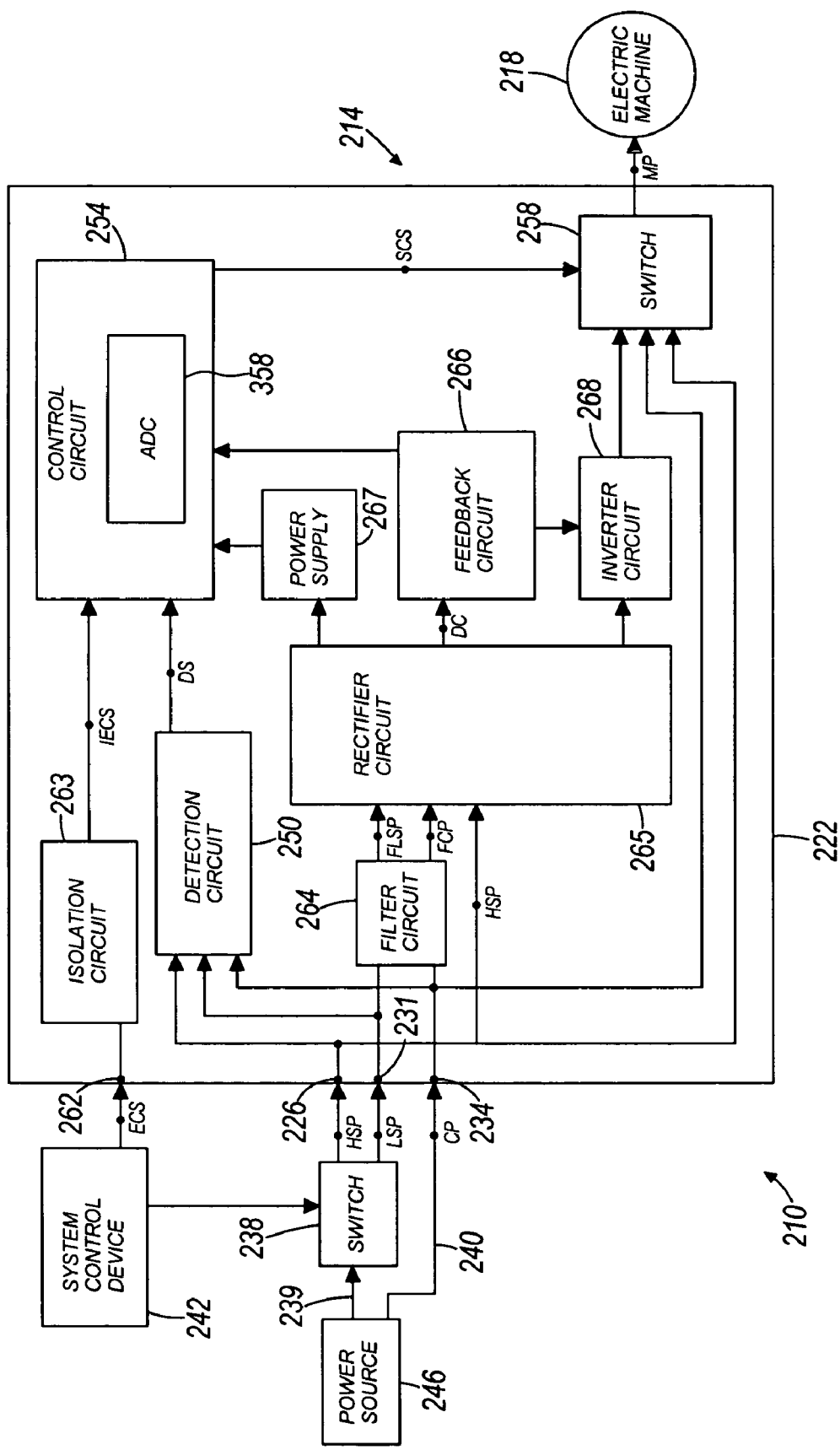
FIG. 3 illustrates a block diagram of a system including an electric machine assembly.

FIG. 3 illustrates an HVAC system 210 that includes an electric machine assembly 214. The electric machine assembly 214 includes an electric machine 218 and a controller 222 connected to the electric machine 218. The illustrated electric machine 218 comprises an induction motor such as a single-speed, single-phase (SSSP) permanent split capacitance (PSC) motor or a multiple-tapped, single-phase (MTSP) PSC motor. In other constructions, the electric machine 218 can comprise other types of electric motors (e.g., other types of induction motors, brushless permanent magnet motors, switched reluctance motors, direct current motors, and the like) and/or other types of electric machines having a rotor and a stator. It should be understood that aspects of the invention may be utilized in other types of systems and the HVAC system 210 is merely shown and described as one such example.

With reference to FIG. 3, the controller 222 includes a first power connection 226 (e.g., a cooling mode power connection), a second power connection 231 (e.g., a heating mode power connection), and a third power connection 234. A switch 238 (e.g., a thermostat relay) driven by a system control device 242 (e.g., a thermostat) selectively connects a first power line 239 of a power source 246 (e.g., an alternating current power source such as a nominal 115 VAC, 230 VAC, 277 VAC utility power source, a direct current power source, a combination of an alternating current power source and a direct current power source, and the like) to the first and second power connections 226 and 231. The third power connection 234 can be connected directly to a second power line 240 of the power source 246.

The illustrated switch 238 connects the first power line 239 to the first power connection 226 when the system control device 242 generates a high-speed control and connects the first power line 239 to the second power connection 231 when the system control device 242 generates a low-speed control. In other constructions, the system control device 242 may generate controls corresponding to other control parameters of the electric machine (e.g., torque, fluid flow, and the like). For discussion purposes, the power received at the first power connection 226 is described herein as a high-speed power HSP, the power received at the second power connection 231 is described herein as a low-speed power LSP, and the power received at the third power connection 234 is described herein as a neutral or common power CP. It should be understood that the power received at each of the first and second power connections 226 and 231 can be utilized to adjust control parameters of the electric machine 218 other than speed.

With continued reference to FIG. 3, the controller 222 can also include a detection circuit 250, a control circuit 254, a switch 258, an external control signal connection 262, an isolation circuit 263, a filter circuit 264, a rectifier circuit 265, a feedback circuit 266, a power supply 267, and an inverter circuit 268.

The detection circuit 250 is configured to detect whether power is present at a first node of the controller 222 (e.g., the first power connection 226), detect whether power is present at a second node of the controller 222 (e.g., the second power connection 231), and generate a detection signal DS based at least in part on the detection. Although the detection circuit 250 is illustrated as detecting whether power is present at the first power connection 226 and the second power connection 231, the detection circuit 250 can be configured to detect whether power is present at any nodes of the controller 222. In some constructions, the detection circuit 250 can detect whether power is present at more than two nodes of the controller 222.

The detected power can include an unregulated power (e.g., a utility power), a regulated power, and/or a combination of regulated power and unregulated power. The detected power can further include an alternating current, a direct current, and/or a combination of an alternating current and a direct current. As used herein, a detected power is a power that meets a predefined condition (e.g., a power sufficient to energize the electric machine 218 for operation, a power that meets or exceeds a threshold level, and the like). Further as used herein, no power generally refers to the lack of detected power (e.g., a substantial absence of power, a power that does not meet the predefined condition, and the like).

The detection circuit 250 can detect power by sensing at least one electrical characteristic representative of power (e.g., voltage, current, frequency, and the like). In the illustrated constructions, the detection circuit 250 only determines whether a detected power is present at the respective node. In other constructions, the detection circuit can be configured to detect various levels of detected power at the respective node.

The detection signal DS includes at least a first state, a second state, a third state, and a fourth state. The first state indicates detected power is not present at the first node and the second node. The second state indicates detected power is only present at the first node. The third state indicates detected power is only present at the second node. The fourth state indicates detected power is present at both of the first node and the second node. The detection signal DS can include one or more signals. Accordingly, each signal of the detection signal DS can represent one or more states of the detection signal DS.

Figure 4:
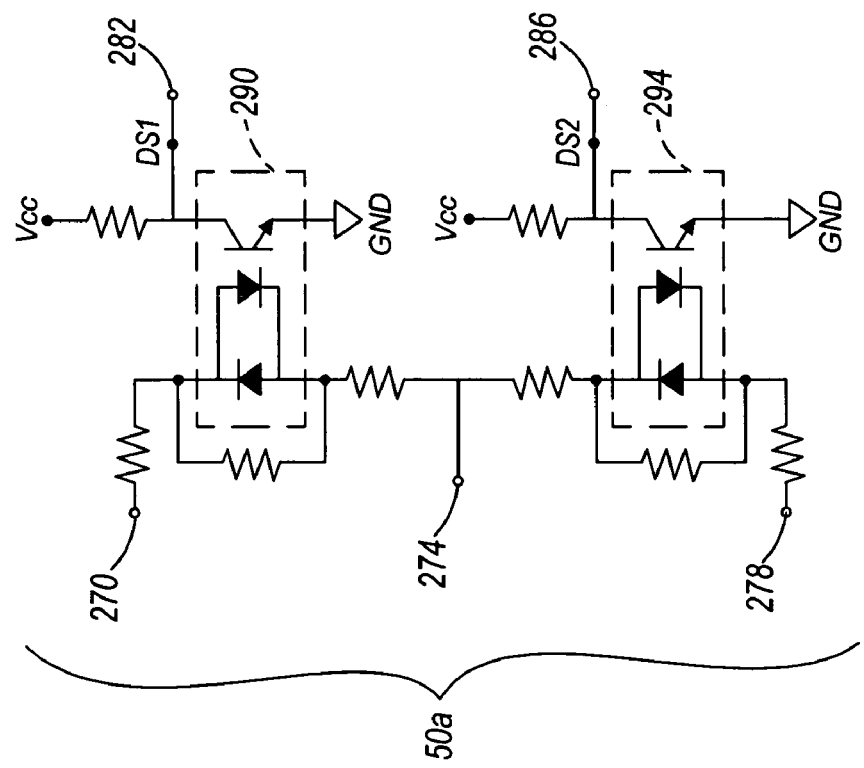
FIG. 4 illustrates a solid-state detection circuit of the electric machine assembly of FIG. 3.

FIG. 4 illustrates a solid-state detection circuit 250*a*. The detection circuit 250*a* includes a first connection 270 configured to receive an input representative of the high-speed power HSP, a second connection 274 configured to receive an input representative of the common power CP, and a third connection 278 configured to receive an input representative of the low-speed power LSP. As used herein and in the appended claims, terminology describing the use of a power or a signal and/or receipt of an input representative of a power or a signal includes use and/or receipt of the actual power or signal and/or a modified version of the actual power or signal. The detection circuit 250a also includes a fourth connection 282 configured to provide a first detection signal DS1 and a fifth connection 286 configured to provide a second detection signal DS2. The detection circuit 250a also includes a first electrical isolation device 290 (e.g., an optical isolation device) having a first portion connected between the first and second connections 270 and 274 and a second portion connected between the fourth connection 282 and ground GND (e.g., a circuit ground provided by the power supply 267). When a detected power is present at the first connection 270 (e.g., when the voltage across the first and second connections 270 and 274 is greater than a threshold level), the first portion of the first device 290 acts as a signal transmitter (e.g., as a light source) and the second portion of the first device 290 acts as a signal receiver (e.g., as a light detector). The first detection signal DS1 includes a logic low signal when the second portion of the first device 290 receives the transmitted signal and a logic high signal the second portion of the first device 290 does not receive the transmitted signal.

The detection circuit 250a also includes a second electrical isolation device 294 having a first portion connected between the second and third connections 274 and 278 and a second portion connected between the fifth connection 286 and ground GND. The second device 294 operates similar to the first device 290. Accordingly, when a detected power is present at the third connection 278 (e.g., when the voltage across the second and third connections 274 and 278 is greater than a threshold level), the second detection signal DS2 includes a logic low signal, and when a detected power is not present at the third connection 278, the second detection signal DS2 includes a logic high signal.

The detection signal DS that includes the first detection signal DS1 and the second detection signal DS2 can be in the first state when detected power is not present at the first connection 270 and the third connection 278, the second state when detected power is only present at the first connection 270, the third state when detected power is only present at the third connection 278, and the fourth state when detected power is present at both of the first connection 270 and the third connection 278. The detection circuit 250a may be configured to generate an alternative detection signal DS in other constructions. Use of the first and second devices 290 and 294 in the detection circuit 250b results in electrical isolation of power present at the first, second, and/or third connections 270, 274, and 278 from the first and/or second detection signals DS1 and DS2. In one construction, the first and second devices 290 and 294 include a Toshiba TLP280 photocoupler. In other constructions, other types of electrical isolation devices can be utilized.

Figure 5:
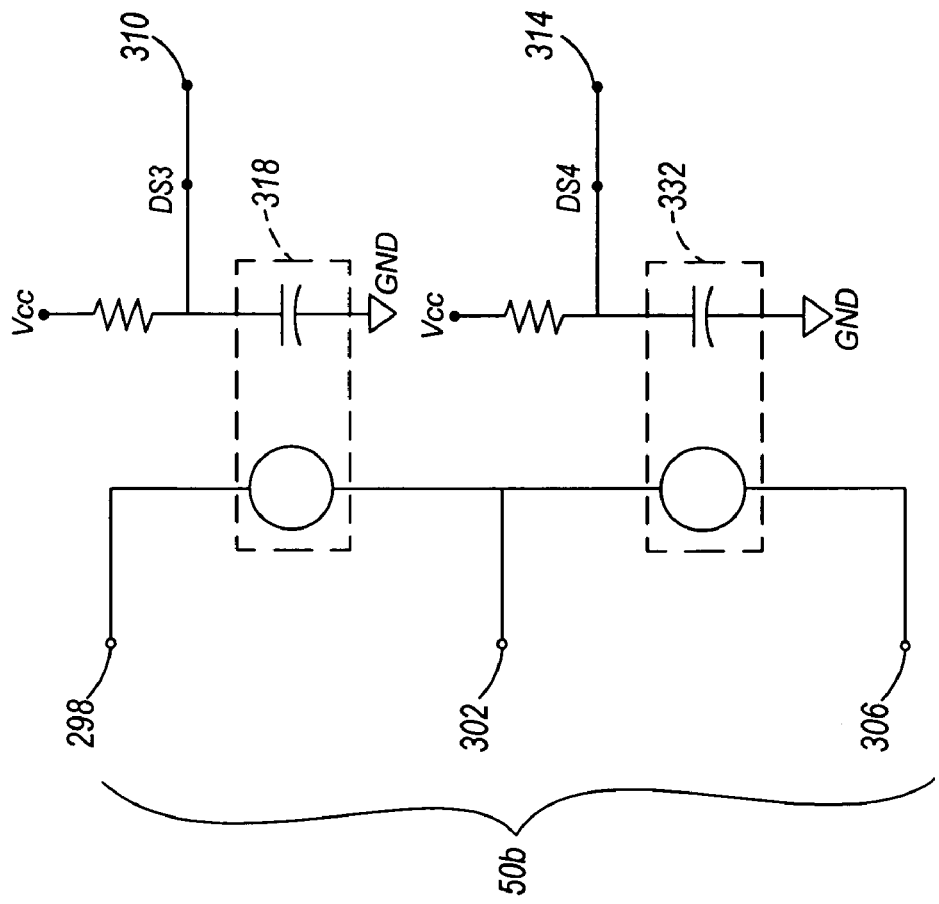
FIG. 5 illustrates an electromechanical detection circuit of the electric machine assembly of FIG. 3.

FIG. 5 illustrates an electromechanical detection circuit 250b. The detection circuit 250b includes a first connection 298 configured to receive an input representative of the high-speed power HSP, a second connection 302 configured to receive an input representative of the common power CP, and a third connection 306 configured to receive an input representative of the low-speed power LSP. The detection circuit 250b also includes a fourth connection 310 configured to provide a first detection signal DS3 and a fifth connection 314 configured to provide a second detection signal DS4. The detection circuit 250b also includes a first electrical isolation device 318 having a first portion connected between the first and second connections 298 and 302 and a second portion connected between the fourth connection 310 and ground GND. When a detected power is present at the first connection 298 (e.g., when the voltage across the first and second connections 298 and 302 is greater than a threshold level), the first portion of the first device 318 acts as a signal transmitter (e.g., as an electromagnetic field generator) and the second portion of the first device 318 acts as a signal receiver (e.g., as a switch having a portion movable in response to the electromagnetic field). The first detection signal DS3 includes a logic low signal when the second portion of the first device 318 receives the transmitted signal and a logic high signal when the second portion of the first device 318 does not receive the transmitted signal.

The detection circuit 250b also includes a second electrical isolation device 322 having a first portion connected between the second and third connections 302 and 306 and a second portion connected between the fifth connection 314 and ground GND. The second device 322 operates similar to the first device 318. Accordingly, when a detected power is present at the third connection 306 (e.g., when the voltage across the second and third connections 302 and 306 is greater than a threshold level), the second detection signal DS4 includes a logic low signal, and when a detected power is not present at the third connection 306, the second detection signal DS4 includes a logic high signal.

The detection signal DS that includes the first detection signal DS3 and the second detection signal DS4 can be in the first state when detected power is not present at the first connection 298 and the third connection 306, the second state when detected power is only present at the first connection 298, the third state when detected power is only present at the third connection 306, and the fourth state when detected power is present at both of the first connection 298 and the third connection 306. The detection circuit 250b may be configured to generate an alternative detection signal DS in other constructions. Use of the first and second devices 318 and 322 in the detection circuit 250b results in electrical isolation of power present at the first, second, and/or third connections 298, 302, and 306 from the first and second detection signals DS3 and DS4. In one construction, the first and second devices 318 and 322 include a relay. In other constructions, other types of electrical isolation devices can be utilized.

Each of the detection circuits 250a and 250b is configured to detect the presence of power when the detected power includes a nominal voltage in a range between approximately 90 VAC and 277 VAC. In other constructions, the detection circuits 250a and 250b can be configured to detect alternative ranges of power. The detectable power range of the detection circuits 250a and 250b includes a lower threshold corresponding to a minimal line voltage of a nominal 115 VAC power source and an upper threshold corresponding to a nominal 277 VAC power source. Accordingly, the controller 222 can be utilized in systems that receive power from one of a plurality of different alternating current power sources. In some constructions, the lower threshold of the power range can be decreased and/or increased by adjusting under-voltage circuitry of the controller 222, and the upper threshold of the power range can be decreased and/or increased by adjusting power ratings of circuitry of the controller 222.

Figure 6:
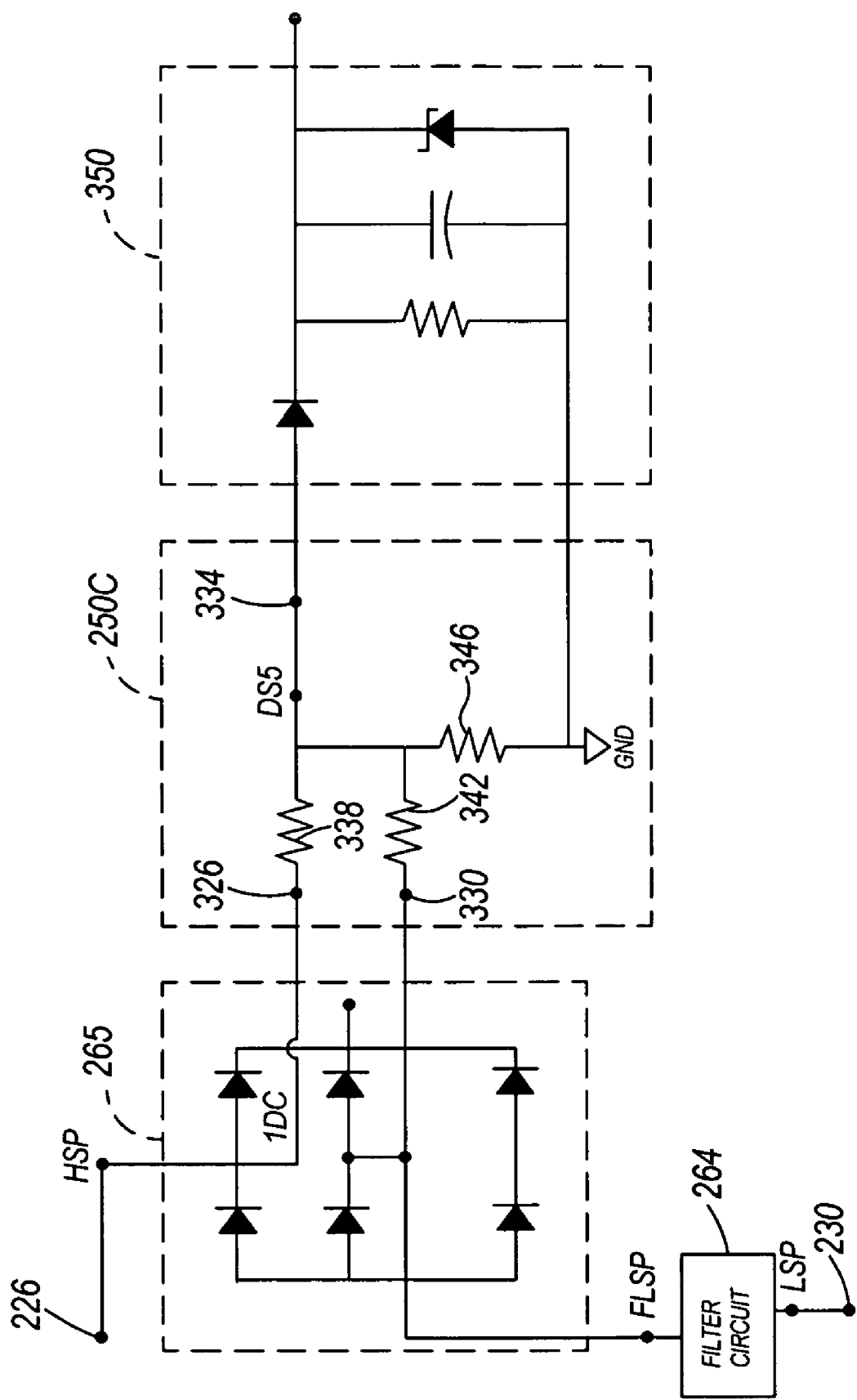
FIG. 6 illustrates a solid-state detection circuit of the electric machine assembly of FIG. 3.

FIG. 6 illustrates a solid-state detection circuit 250c. The detection circuit 250c includes a first connection 326 configured to receive an input representative of the high-speed power HSP and a second connection 330 configured to receive an input representative of the low-speed power LSP. In some constructions, as illustrated in FIG. 6, the input representative of the low-speed power LSP can include an input representative of a filtered low-speed power FLSP where the filtered low-speed power FLSP is generated using the filter circuit 264. The detection circuit 250c also includes a third connection 334 configured to provide a detection signal DS5. The detection circuit 250c includes a resistive network having a first resistive device 338 (e.g., a 1 megohm resistor) connected between the first and third connections 326 and 334, a second resistive device 342 (e.g., a 499 kilo-ohm resistor) connected between the second and third connections 330 and 334, and a third resistor 346 (e.g., a 10 kilo-ohm resistor) connected between the third connection 334 and ground GND. In other constructions, the resistive network can be alternatively configured.

The resistive network sums the voltage associated with each detected power to generate the detection signal DS5. The detection signal DS5 can be in the first state when detected power is not present at the first connection 326 and the second connection 330, the second state when detected power is only present at the first connection 326, the third state when detected power is only present at the second connection 330, and the fourth state when detected power is present at both of the first connection 326 and the third connection 330. The detection circuit 250c can be configured to generate an alternative detection signal DS in other constructions.

Referring back to FIG. 3, the control circuit 254 is configured to receive the detection signal DS, select a control mode based at least in part on the detection signal DS, and generate a switch control signal SCS based at least in part on the selected control mode. In the illustrated construction, the control circuit 254 includes a programmable device (e.g., a micro-controller such as a PIC 16C717I/SS micro-controller from MicroChip, a ST microcontroller from ST Microelectronics, and the like). In other constructions, the control circuit 254 can include logic-based components or other circuitry configured to generate the switch control signal SCS based at least in part on the selected control mode. The control circuit 254 can include an associated memory internal and/or external to the control circuit 254 that stores a plurality of codes and associated parameters.

In some constructions, the detection signal DS is filtered to enhance the signal for detection by the control circuit 254. As illustrated in FIG. 6, the third connection 334 is electrically connected to a filter 350 to filer the detection signal DS5. The filter 350 includes a diode that half-wave rectifies the detection signal DS5, a resistor-capacitor arrangement to reduce undesirable noise in the detection signal DS5, and a zener diode to establish a maximum voltage level of the detection signal DS5. Filters may be alternatively configured in other constructions.

In some constructions, an analog-to-digital converter (ADC) 358 (FIG. 3) is utilized to convert inputs representative of a detection signal DS from an analog signal to a digital signal. The ADC 358 can be embedded in the control circuit 254 as shown in FIG. 3, or the ADC 358 can be external to the control circuit 254.

The control circuit 254 can include a plurality of control modes including an OFF control mode, a first operational control mode, second operational control mode, and a third operational control mode. The third operational control mode can include an external control mode as described further below. In the illustrated construction, the OFF control mode is selected when the detection signal DS is in the first state, the first operational control mode is selected when the detection signal DS is in the second state, the third operational control mode is selected when the detection signal DS is in the third state, and the fourth operational control mode is selected when the detection signal DS is in the fourth state. In other constructions, the control modes can correspond to other states of the received detection signal DS.

The switch control signal SCS can include one or more signals. In the illustrated construction, the switch control signal SCS includes at least one signal for each switch the switch 258 includes. The switch 258 can include a plurality of switches (e.g., relays) configured to energize the electric machine 218 for operation using a power input received by the switch 258 (e.g., a power input representative of the high-speed power HSP, a power input representative of an inverted power IP generated by the inverter circuit 268 using the low-speed power LSP, and the like). In some constructions, the switch 258 can include multiple switches for a single power input (e.g., the switch 258 can include multiple relays to handle the current associated with a large power input such as those utilized to energize a one horsepower electric machine for operation).

FIG. 3 illustrates one example of how power inputs of the switch 258 can be generated. The low-speed power LSP and the common power are fed to and filtered by the filter circuit 264. The filter circuit 264 can include an electromagnetic interference (EMI) filter that attenuates electromagnetic interference present in the low-speed power LSP and/or the common power CP. The filter circuit 264 generates a filtered low-speed power FLSP and a filtered common power FCP which are fed along with the high-speed power HSP to the rectifying circuit 265.

The illustrated rectifier circuit 265 includes a high-speed rectifier and a low-speed rectifier. The filtered low-speed power FLSP and the filtered common power FCP are fed to the low-speed rectifier to generate a low-speed direct current signal, and the high-speed power HSP and the filtered common power FCP are fed to the high-speed rectifier to generate a high-speed direct current signal. Each of the high-speed and low-speed rectifiers includes a full-wave rectifier having four diodes connected in a bridge arrangement. As illustrated in FIG. 6, the high-speed rectifier and the low-speed rectifier can share a common pair of diodes, and a common direct current signal DC (i.e., the low-speed direct current signal and the high-speed direct current signal are equal).

The direct current signal DC is frequency regulated in the inverter circuit 268. The illustrated inverter circuit 268 includes a capacitor-inverter circuit (e.g., a first capacitor serially connected to a second capacitor) and a plurality of power switches that are arranged in parallel with the first and the second capacitors. The inverter circuit 268 can be configured to provide one or more input powers to the switch 258. Each input power can correspond to a predetermined control parameter (e.g., speed, torque, fluid flow, and the like) of the electric machine 218.

The feedback circuit 266 can include a direct current feedback monitor that couples the rectifying circuit 265 to the inverter circuit 268. The feedback circuit 266 can be configured to monitor the direct current signal DC (sometimes referred to as a direct current bus voltage or a direct current speed signal) of the rectifying circuit 265. When the monitored direct current signal DC changes, the feedback circuit 266 alerts the control circuit 254 to adjust the duty cycle of the inverter circuit 268 accordingly. The feedback circuit 266 can also be configured to detect the value of the high-speed power HSP. Such information can be utilized by the control circuit 254 to adjust the switch control signal SCS (e.g., to stop energization of the electric motor 218 if the high-speed power HSP is outside an acceptable range of input power for the electric machine 218).

The illustrated power supply 267 includes a DC-DC power supply configured to provide a supply power to the control circuit. In some constructions, the power supply 267 can provide power to other components of the controller 222.

The external control signal connection 262 of the controller receives an input representative of an external control signal ECS. Similar to other signals discussed herein, the external control signal ECS can include one or more signals. Depending on the system configuration, the external control signal ECS can be provided directly to the external control signal connection 262 via the system control device 242 or indirectly to the external control signal connection 262 via the system control device 242. In one construction, the external control signal is received and interpreted by a system control board (e.g., a furnace board that includes the switch 238). The system control board uses the interpreted results to control switches (e.g., the switch 238). The external control signal ECS can include signals representative of the outputs of the controlled switches on the system control board. In an HVAC system for example, the external control signal ECS can include a high cool signal, a low cool signal, a high heat signal, a low heat signal, a fan only signal, and auxiliary heat signal, and the like. Often, the external control signal ECS includes one or more nominal 24 VAC signals. The isolation circuit 263 isolates the control circuit from the external control signal ECS. In one construction, the isolation circuit 263 includes at least one optical isolation device. In other constructions, the isolation circuit includes at least one relay.

Depending on the type of system in which the electric machine assembly 214 or a portion thereof is installed, the installer may which to cause the control circuit 254 to select a specific mode (e.g., the external control mode). In the illustrated construction, the external control mode is selected when detected power is present at both the first and second node. Accordingly, in the illustrated construction, the installer can ensure the control circuit 254 enters the external control mode by electrically connecting the first and second power connections 226 and 231 to the first power line 239. This may be accomplished by connecting one of the first and second power connections 226 and 231 to the first power line 239 and connecting a jumper between the first and second power connections 226 and 231. The switch control signal SCS is based at least in part on the external control signal ECS when the control circuit 254 enters the external control mode. In some constructions, the switch 238 can be eliminated from the system control board when a system is designed for hard-wired connection of the first and second power connections 226 and 231 to the first power line 239.

Various features and advantages of the invention are set forth in the following claims.

What is claimed is:

1. A method of controlling an electric machine using a controller, the electric machine comprising a rotor and a stator, the method comprising:
    detecting whether power is present at a first node of the controller, the detecting act comprising determining whether power is present across the first node of the controller and a common node of the controller;
    detecting whether power is present at a second node of the controller, the detecting act comprising determining whether power is present across the second node of the controller and the common node of the controller;
    generating at least one signal based at least in part on the detecting acts, including
        generating a first signal based at least in part on whether power is present at the first node of the controller, and
        generating a second signal based at least in part on whether power is present at the second node of the controller; and
    using a detected power to energize the electric machine when the at least one signal indicates power is present at at least one of the first node, the second node, and a combination of the first node and the second node.

2. A method according to claim 1 wherein the controller comprises an inverter, and wherein using a detected power to energize the electric machine comprises
    providing the detected power to the inverter,
    the inverter generating an inverted power using the detected power, and
    using the inverted power to energize the electric machine.

3. A method according to claim 1 wherein the detected power comprises at least one of an unregulated power, a regulated power, and a combination of an unregulated power and a regulated power.

4. A method according to claim 1 wherein the detected power comprises at least one of an alternating current, a direct current, and a combination of an alternating current and a direct current.

5. A method according to claim 1 wherein detecting whether power is present comprises detecting whether power is present that comprises a nominal voltage in a range between approximately 90 volts alternating current and 277 volts alternating current.

6. A method according to claim 1 wherein detecting whether power is present comprises detecting whether at least one of a voltage, a current, a frequency, and a combination of a voltage, a current, and a frequency is present.

7. A method according to claim 1 wherein the controller comprises a solid-state circuit that performs the detecting whether power is present at a first node, the detecting whether power is present at a second node, and the generating at least one signal.

8. A method according to claim 7 and further comprising electrically isolating the detected power from the first and second signals, wherein the solid-state circuit also performs the electrically isolating the detected power.

9. A method according to claim 1 and further comprising electrically isolating a detected power from the first and second signals, wherein the controller comprises an electromechanical circuit that performs the detecting whether power is present at a first node, the detecting whether power is present at a second node, the generating at least one signal, and the electrically isolating a detected power.

10. A method of controlling an electric machine using a controller, the electric machine comprising a rotor and a stator, the method comprising:
    detecting whether power is present at a first node of the controller, the detecting act comprising determining whether power is present across the first node of the controller and a common node of the controller;
    detecting whether power is present at a second node of the controller, the detecting act comprising determining whether power is present across the second node of the controller and the common node of the controller;
    generating at least one signal based at least in part on the detecting acts;
    using a detected power to energize the electric machine when the at least one signal indicates power is present at at least one of the first node, the second node, and a combination of the first node and the second node; and the controller receiving at least one external control signal, wherein using a detected power to energize the electric machine is based at least in part on the at least one external control signal when the at least one signal indicates power is present at both of the first node and the second node.

11. A method of controlling an electric machine using a controller, the electric machine comprising a rotor and a stator, the method comprising:

detecting whether power is present at a first node of the controller;

detecting whether power is present at a second node of the controller;

generating at least one signal based at least in part on the detecting acts; and using a detected power to energize the electric machine when the at least one signal indicates power is present at at least one of the first node, the second node, and a combination of the first node and the second node;

wherein the at least one signal comprises a first state, a second state, a third state, and a fourth state, wherein the first state indicates a detected power is not present at the first node and the second node, wherein the second state indicates a detected power is only present at the first node, wherein the third state indicates a detected power is only present at the second node, and wherein the fourth state indicates a detected power is present at both of the first node and the second node.

12. A method of controlling an electric machine using a controller, the electric machine comprising a rotor and a stator, the controller comprising a programmable device, the method comprising:

detecting whether power is present at a first node of the controller;

detecting whether power is present at a second node of the controller;

generating at least one signal based at least in part on the detecting acts;

receiving at least one external control signal at the controller;

selecting a control mode of the programmable device based at least in part on the at least one signal, the control mode being one of a plurality of control modes of the programmable device, the plurality of control modes including an external control mode;

selecting the external control mode when the at least one signal indicates a detected power is present at both the first node and the second node;

the programmable device generating a control signal based at least in part on the control mode; and controlling energization of the electric machine using the control signal, based at least in part on the at least one external control signal when the external control mode is selected, the electric machine being energized using a detected power.

13. A method according to claim 12 wherein controlling energization of the electric machine comprises controlling a control parameter of the electric machine, and wherein the control parameter comprises at least one of speed, torque, fluid flow, and a combination of speed, torque, and fluid flow.

14. A method according to claim 12 wherein the plurality of control modes comprises an OFF control mode, wherein selecting a control mode comprises selecting the OFF control mode when the at least one signal indicates a detected power is not present at the first node and the second node, and wherein controlling energization of the electric machine comprises not energizing the electric machine when the OFF control mode is selected.

15. A method according to claim 12 wherein the plurality of control modes comprises a first operational control mode, wherein selecting a control mode comprises selecting the first operational control mode when the at least one signal indicates a detected power is present at the first and second nodes in a first defined manner, and wherein controlling energization of the electric machine comprises energizing the electric machine for high-speed operation when the first operational control mode is selected.

16. A method according to claim 15 wherein the plurality of control modes comprises a second operational control mode, wherein selecting a control mode comprises selecting the second operational control mode when the at least one signal indicates a detected power is present at the first and second nodes in a second defined manner, and wherein controlling energization of the electric machine comprises energizing the electric machine for low-speed operation when the second operational control mode is selected.

17. A method according to claim 16 wherein the plurality of control modes comprises a third operational control mode, wherein selecting a control mode comprises selecting the third operational control mode when the at least one signal indicates a detected power is present at the first and second nodes in a third defined manner, and wherein controlling energization of the electric machine comprises energizing the electric machine for one of a plurality of operations when the third operational control mode is selected, the plurality of operations comprising a low-speed operation and a high-speed operation.

18. A method according to claim 17 wherein the first defined manner is a detected power being present at only the first node, wherein the second defined manner is a detected power being present at only the second node, and wherein the third defined manner is a detected power being present at both the first node and the second node.

19. A method according to claim 12 wherein detecting whether power is present at a first node of the controller comprises detecting a first detected power, wherein detecting whether power is present at a second node of the controller comprises detecting a second detected power, and wherein the first detected power and the second detected power are substantially equal.

20. A system comprising:

an electric machine comprising a stator and a rotor;

a system control device; and a controller electrically connected to the electric machine, the controller comprising:

a first node configured to receive a first power;

a second node configured to receive a second power;

a third node configured to receive at least one external control signal from the system control device;

a first circuit configured to detect whether the first power is present at a first node of the controller, detect whether the second power is present at the second node, and generate at least one signal, the at least one signal being representative of whether the first power is present at the first node and whether the second power is present at the second node, a second circuit configured to receive the at least one signal and generate a switch control signal, a third circuit configured to electrically isolate the at least one external control signal from the second circuit, and a switch configured to selectively energize the electric machine based at least in part on the switch control signal, the switch using at least one of the first power, the second power, and a combination of the first power and the second power to energize the electric machine when the at least one signal indicates at least one of the first power is present at the first node, the second power is present at the second node, and a combination of the first power is present and the first node and the second power is present at the second node.

21. A system according to claim 20 wherein the first circuit detects the presence of the first power when the first power comprises a nominal voltage in a range between approximately 90 volts alternating current and 277 volts alternating current, and wherein the first circuit detects the presence of the second power when the second power comprises a nominal voltage in a range between approximately 90 volts alternating current and 277 volts alternating current.

22. A system according to claim 20 wherein the first circuit comprises a solid-state optical isolation device that electrically isolates at least one of the first power, the second power, and a combination of the first power and the second power from the at least one signal.

23. A system according to claim 20 wherein the first circuit comprises an electromechanical relay that electrically isolates the first power, the second power, and a combination of the first power and the second power from the at least one signal.

24. A system according to claim 20 wherein the system control device comprises a thermostat, and wherein the at least one external control signal comprises a heat command signal and a cool command signal.

25. A system according to claim 20 wherein the system control device is a system control board.

26. A system according to claim 20 wherein the switch control signal is based at least in part on the external control signal when the first power is present at the first node and the second power is present at the second node.

27. A system according to claim 20 wherein the second circuit comprises a programmable device having a plurality of control modes, wherein the plurality of control modes comprises an OFF control mode, a first operational control mode, a second operational control mode, and a third operational control mode, wherein one of the plurality of control modes is selected based at least in part on the at least one signal, and wherein the switch control signal is based at least in part on the selected control mode.

28. A system according to claim 27 wherein the third operational control mode comprises the external control mode, wherein the external control mode is selected when the at least one signal indicates the first power is present at the first node and the second power is present at the second node.

29. A system according to claim 27 wherein the switch does not energize the electric machine when the OFF control mode is selected.

30. A system according to claim 27 wherein the switch energizes the electric machine for high control parameter operation when the first operational control modes is selected, wherein the switch energizes the electric machine for low control parameter operation when the second operational control mode is selected, and wherein the control parameter includes at least one of speed, torque, fluid flow, and a combination of speed, torque, and fluid flow.

31. A method according to claim 10 wherein the controller comprises an inverter, and wherein using a detected power to energize the electric machine comprises
providing a detected power to the inverter,
the inverter generating an inverted power using the detected power, and
using the inverted power to energize the electric machine.

32. A method according to claim 10 wherein the controller comprises a solid-state circuit that performs the detecting whether power is present at a first node, the detecting whether power is present at a second node, and the generating at least one signal.

33. A method according to claim 32 and further comprising electrically isolating the detected power from the at least one signal, wherein the solid-state circuit also performs the electrically isolating the detected power.

34. A method according to claim 10 and further comprising electrically isolating a detected power from the at least one signal, wherein the controller comprises an electromechanical circuit that performs the detecting whether power is present at a first node, the detecting whether power is present at a second node, the generating at least one signal, and the electrically isolating a detected power.

35. A method according to claim 11 wherein the controller comprises an inverter, and wherein using a detected power to energize the electric machine comprises
providing a detected power to the inverter,
the inverter generating an inverted power using the detected power, and
using the inverted power to energize the electric machine.

36. A method according to claim 11 wherein the controller comprises a solid-state circuit that performs the detecting whether power is present at a first node, the detecting whether power is present at a second node, and the generating at least one signal.

37. A method according to claim 36 and further comprising electrically isolating the detected power from the at least one signal, wherein the solid-state circuit also performs the electrically isolating detected power.

38. A method according to claim 11 and further comprising electrically isolating a detected power from the at least one signal, wherein the controller comprises an electromechanical circuit that performs the detecting whether power is present at a first node, the detecting whether power is present at a second node, the generating at least one signal, and the electrically isolating a detected power.

39. A method of controlling an electric machine using a controller, the electric machine comprising a rotor and a stator, the controller comprising a programmable device, the method comprising:
detecting whether power is present at a first node of the controller, the detecting act comprising determining whether power is present across the first node of the controller and a common node of the controller;
detecting whether power is present at a second node of the controller, the detecting act comprising determining whether power is present across the second node of the controller and a common node of the controller;
generating a first signal based at least in part on whether power is present at the first node of the controller;
generating a second signal based at least in part on whether power is present at the second node of the controller;
selecting a control mode of the programmable device based at least in part on the first signal and the second signal, the control mode being one of a plurality of control modes of the programmable device;

the programmable device generating a control signal based at least in part on the control mode; and controlling energization of the electric machine using the control signal, the electric machine being energized using a detected power.

40. A method according to claim 39 wherein controlling energization of the electric machine comprises controlling a control parameter of the electric machine, and wherein the control parameter comprises at least one of speed, torque, fluid flow, and a combination of speed, torque, and fluid flow.

* * * * *